(12) United States Patent
Sohail et al.

(10) Patent No.: US 11,507,698 B2
(45) Date of Patent: Nov. 22, 2022

(54) BLOCKCHAIN-BASED ATTESTATION SERVICE

(71) Applicant: Dell Products L.P., Round Rock, TX (US)

(72) Inventors: Mohamed Sohail, Sheikh Zayed (EG); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/152,037

(22) Filed: Jan. 19, 2021

(65) Prior Publication Data

US 2022/0229936 A1    Jul. 21, 2022

(51) Int. Cl.
| | |
|---|---|
| *G06F 21/64* | (2013.01) |
| *G06F 16/23* | (2019.01) |
| *G16Y 40/35* | (2020.01) |
| *H04L 67/12* | (2022.01) |
| *G16Y 30/10* | (2020.01) |
| *H04L 9/40* | (2022.01) |

(52) U.S. Cl.
CPC .......... *G06F 21/64* (2013.01); *G06F 16/2379* (2019.01); *G16Y 30/10* (2020.01); *G16Y 40/35* (2020.01); *H04L 63/20* (2013.01); *H04L 67/12* (2013.01)

(58) Field of Classification Search
CPC ..... G06F 21/64; G06F 16/2379; H04L 63/20; H04L 67/12; G16Y 30/10; G16Y 40/35
USPC ........................................................... 726/1
See application file for complete search history.

(56) References Cited

U.S. PATENT DOCUMENTS

| | | | | |
|---|---|---|---|---|
| 2019/0158521 | A1* | 5/2019 | Juliato | H04L 63/1466 |
| 2019/0349254 | A1* | 11/2019 | Nolan | H04L 67/12 |
| 2021/0110310 | A1* | 4/2021 | Guim | H04L 63/126 |
| 2022/0060512 | A1* | 2/2022 | Crabtree | H04L 63/1425 |

OTHER PUBLICATIONS

Lahabib et al., 2019 IEEE Wireless Communications and Networking Conference (WCNC), "Blockchain based trust management mechanism for IoT", (Year: 2019).*
Lahabib et al., 2019 IEEE Wireless Communications and Networking Conference (WCNC), "Blockchain based trust management mechanism for IoT", pp. 1-8 (Year: 2019).*
Luecking et al., 03, 2020 IEEE, "Decentralized Identity and Trust Management Framework for Internet of Things", (Year: 2020).*

* cited by examiner

*Primary Examiner* — Khalil Naghdali
(74) *Attorney, Agent, or Firm* — Daly, Crowley, Mofford & Durkee, LLP

(57) ABSTRACT

A method, comprising: obtaining a data item that is associated with an IoT device, the IoT device including one or more of a sensor, an actuator, or an energy source; obtaining, from a blockchain-based attestation system, a trust score that is associated with the data item, the trust score being generated by using a consensus-building mechanism that is provided by the blockchain-based attestation system; when the trust score satisfies a predetermined condition, using the data item; and when the trust score fails to satisfy the predetermined condition, discarding the data item, wherein the IoT device is configured to operate as a node in the blockchain-based attestation system, and the blockchain-based attestation system includes one or more other IoT devices that are part of the same IoT device network as the IoT device.

19 Claims, 9 Drawing Sheets

BLOCKCHAIN-BASED ATTESTATION SERVICE

BACKGROUND

Information processing systems based on the Internet of Things (IoT) can be configured to process potentially enormous amounts of data from distributed sensors, smart objects, smart appliances, smart automobiles or other types and arrangements of interconnected IoT devices, collectively numbering in the billions. However, significant problems have arisen relating to security of IoT devices. For example, many IoT devices are not designed to implement adequate security functionality. Moreover, existing system-based security approaches are often not readily scalable to accommodate the ever-increasing numbers of IoT devices being deployed. Such approaches can unduly increase the complexity of the overall system, leading to adverse impacts on system performance.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: obtaining a data item that is associated with an IoT device, the IoT device including one or more of a sensor, an actuator, or an energy source; obtaining, from a blockchain-based attestation system, a trust score that is associated with the data item, the trust score being generated by using a consensus-building mechanism that is provided by the blockchain-based attestation system; when the trust score satisfies a predetermined condition, using the data item; and when the trust score fails to satisfy the predetermined condition, discarding the data item, wherein the IoT device is configured to operate as a node in the blockchain-based attestation system, and the blockchain-based attestation system includes one or more other IoT devices that are part of the same IoT device network as the IoT device.

According to aspects of the disclosure, a computing device is provided, comprising: a memory; and at least one processor that is operatively coupled to the memory, the at least one processor being configured to perform the operations of: obtaining a data item; obtaining, from a blockchain-based attestation system, a trust score that is associated with the data item, the trust score being generated by using a consensus-building mechanism that is provided by the blockchain-based attestation system; when the trust score satisfies a predetermined condition, using the data item; and when the trust score fails to satisfy the predetermined condition, discarding the data item, wherein the computing device is configured to operate as a node in the blockchain-based attestation system, and the blockchain-based attestation system includes one or more other computing devices.

According to aspects of the disclosure, a non-transitory computer-readable medium is provided that is configured to store one or more processor-executable instructions, which when executed by at least one processor, cause the at least one processor to perform the operations of: obtaining a data item that is associated with an IoT device, the IoT device including one or more of a sensor, an actuator, or an energy source; obtaining, from a blockchain-based attestation system, a trust score that is associated with the data item, the trust score being generated by using a consensus-building mechanism that is provided by the blockchain-based attestation system; when the trust score satisfies a predetermined condition, using the data item; and when the trust score fails to satisfy the predetermined condition, discarding the data item, wherein the IoT device is configured to operate as a node in the blockchain-based attestation system, and the blockchain-based attestation system includes one or more other IoT devices that are part of the same IoT device network as the IoT device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
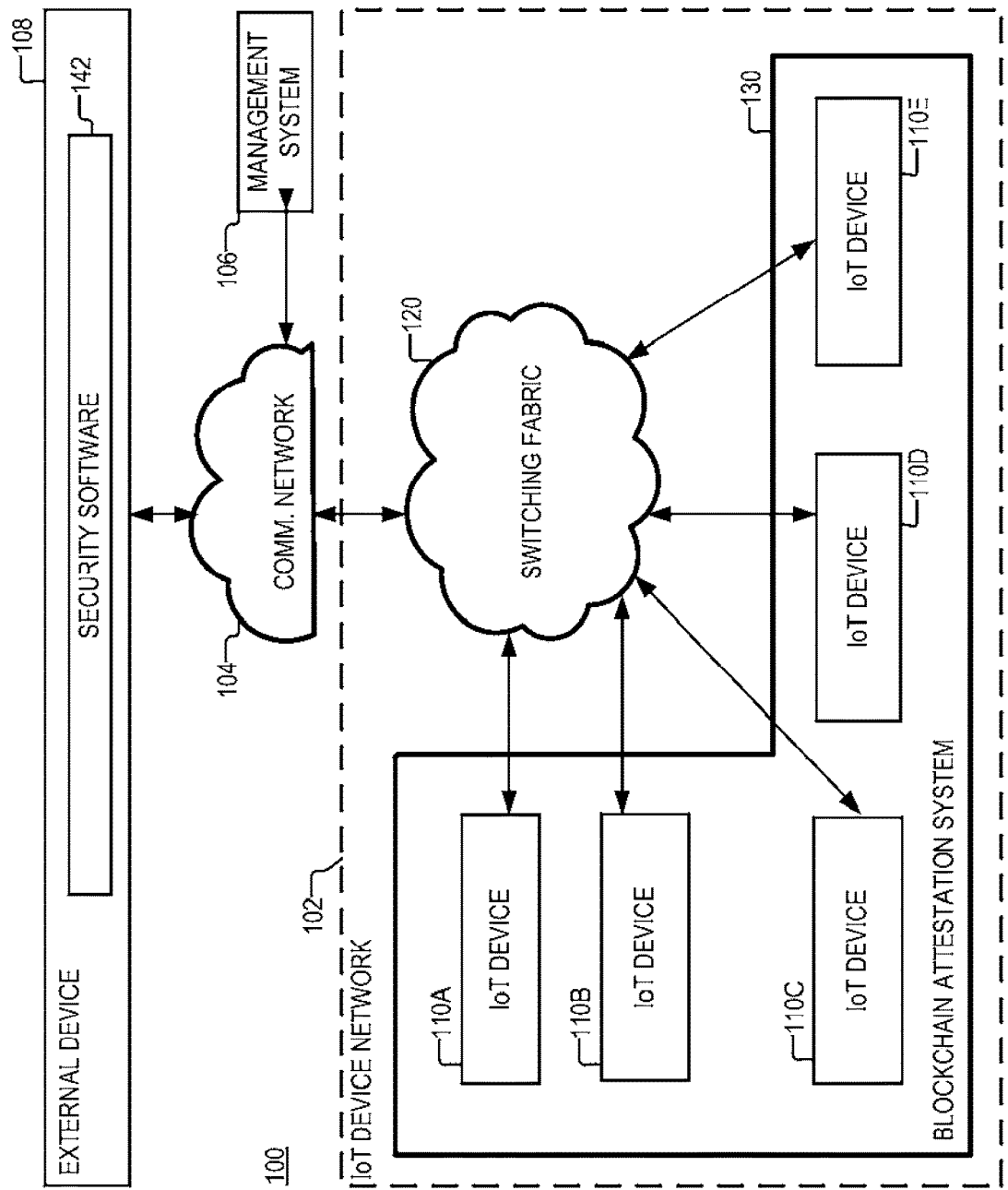
FIG. 1 is a diagram of an example of a system, according to aspects of the disclosure.

FIG. 1 is a diagram of an example of a system 100, according to aspects of the disclosure. As illustrated, the system 100 may include an Internet-of-Things (IoT) device network 102, a communications network 104, a management system 106, and an external device 108.

The IoT device network 102 may include a plurality of IoT devices 110 and a switching fabric 120. The switching fabric 120 may include communications hardware that is used to connect the IoT devices 110 to one another, to the communications network 104, and/or the management system 106. By way of example, the switching fabric may include one or more of (i) an access point that is used by any of the IoT devices 110 to connect to the IoT device network 102, a (ii) a network switch for exchanging communications between the IoT devices 110, and/or (iii) a gateway for connecting the IoT device network 102 to the communications network 104.

The communications network 104 may include one or more of a local area network (LAN), a wide area network (WAN), a 4G network, a 5G network, the Internet, and/or any other suitable type of communications network.

Figure 9:
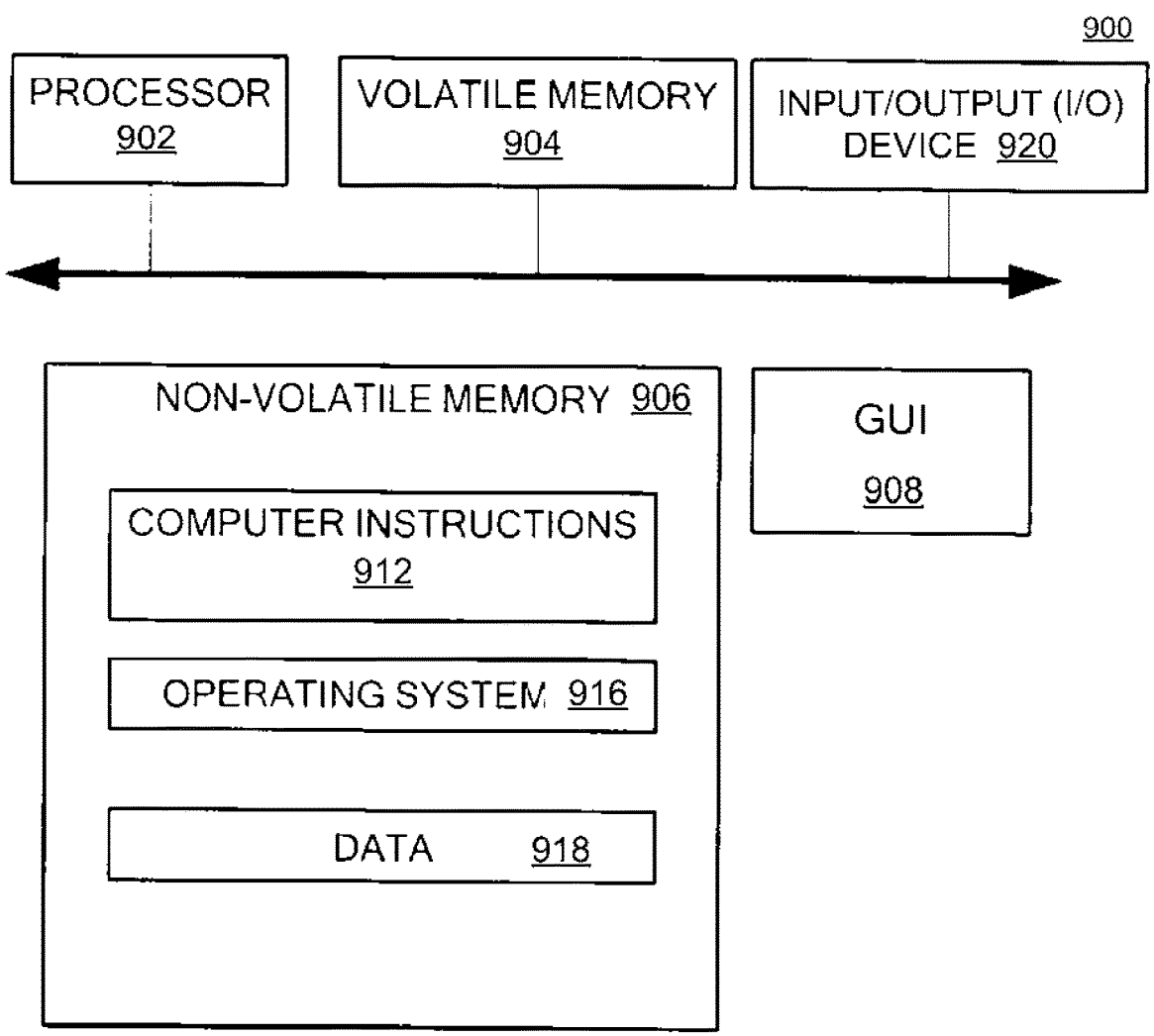
FIG. 9 is diagram of an example of a computing device, according to the prior art.

The management system 106 may include one or more computing systems that are configured to perform at least one of (i) receiving data that is generated by any of the IoT devices 110, (ii) processing data that is generated by any of the IoT devices 110, (iii) collecting and storing data that is generated by any of the IoT devices 110, and (iv) controlling the operation of any of the IoT devices 110. For instance, when the IoT devices 110 are smart home appliances, such as smart light bulbs or smart power outlets, the management system 106 may include a smartphone or a laptop that is used to control the IoT devices. As another example, when the IoT devices 110 are part of a machine or a manufacturing line, the management system 106 may include an automated control system. As yet another example, when the IoT devices 110 include sensors, the management system 106 may include a computing system that is configured to collect and store data that is generated by the IoT devices. In some implementations, the management system 106 may be implemented by using computing systems/devices, such as the computing device 900, which is shown in FIG. 9.

In addition to being part of the IoT device network 102, the IoT devices 110 may also be configured to operate as nodes in a blockchain-based attestation system 130. The blockchain-based attestation system 130 is a blockchain network configured to authenticate data that is associated with any of the IoT devices. The data that is associated with any of the IoT devices may include at least one of: (i) a signature of software that is running on the IoT device, (ii) a command that is transmitted to the IoT device, and (iii) a sensor measurement, a status report, or another data item that is generated by the IoT device. In some implementations, the blockchain-based attestation system 130 may be configured to perform processes 600, 700, and 800, which are discussed further below with respect to FIGS. 6, 7, and 8 respectively.

According to the example of FIG. 1 the blockchain-based attestation system 130 may include a Hyperledger blockchain network. In such implementations, each of the IoT devices may be configured to operate as an endorser node in the Hyperledger blockchain network. Each of the IoT devices may store a copy of (at least a portion) of a ledger of the blockchain-based attestation system 130 and execute chain code that is part of one or more smart contracts in the ledger. By way of example, when an IoT device is configured to operate as an endorser node, the IoT device may: (i) retrieve a smart contract from its local copy of the ledger, (ii) execute one or more rules that are defined in the smart contract, and (iii) provide a result of the execution to another node in the blockchain-based attestation system 130. As another example, when an IoT device is configured to operate as an endorser node, the IoT device may compare a signature for software that is running on another IoT device (i.e., a device that is attempting to join the IoT device network 102) to a baseline signature, and output a result of the comparison to another node in the blockchain-based attestation system 130.

The external device 108 may include one or more computing devices, such as the computing device 900, which is discussed further below with respect to FIG. 9. The external device 108 may be configured to execute security software 142. Security software 142 may be configured to analyze that that is transmitted in IoT device network 102 and/or data that is stored in the management system 106. The security software 142 may be further configured to detect anomalies in the operation of the IoT device network 102, such as anomalies caused by attacks and ransomware, for example. The security software 142 may be configured to generate analytics (hereinafter "security data 214") that are indicative of common attack vectors including entropy changes, known ransomware extensions, data corruption, and deletion, as well as other statistics. The security software 142 may be configured to store the security data 214 (shown in FIG. 2) in in a ledger of a blockchain-based attestation system 130, from where the security data 214 is retrieved by nodes in the blockchain-based attestation system and used to authenticate data that is associated with any of the IoT devices 110. According to the present example, the security software 142 includes the CyberSense TM software suite. However, alternative implementations are possible in which another security software is used to detect intrusions into the IoT device network 102. Stated succinctly, the present disclosure is not limited to using any specific type of security software to assist the operation of the blockchain-based attestation system 130.

Although in the example of FIG. 1, the blockchain-based attestation system 130 includes a Hyperledger blockchain network, it will be understood that alternative implementations are possible in which the blockchain-based attestation system 130 is implemented by using another type of blockchain network (e.g. Ethereum, etc.) Although in the example of FIG. 1 each of the IoT devices is configured to operate as an endorser node of the blockchain-based attestation system 130, alternative implementations are possible in which any of the IoT devices is configured to operate as another type of node, such as a committer node or an ordering node. Although in the example of FIG. 1 all IoT devices in the IoT device network 102 are part of the blockchain-based attestation system 130, alternative implementations are possible in which only some of the IoT devices in the IoT device network 102 are part of the blockchain-based attestation system 130. Although FIG. 1 depicts the blockchain-based attestation system 130 as being formed exclusively of IoT devices, it will be understood that the blockchain-based attestation system 130 may include other computing devices as well. According to the present example, the IoT device network 102 has a hierarchical topology. However, alternative implementations are possible in which the IoT device 102 has a peer-to-peer topology (e.g., an ad-hoc topology, etc.). Furthermore, alternative implementations are possible in which the IoT device 102 has a different topology, such as a ring topology, a star topology, etc. Stated succinctly, the present disclosure is not limited to any specific implementation of the IoT device network 102.

Any of the IoT devices 110 may include one or more of a sensor, an actuator, or an energy source. As used throughout the disclosure, the term "sensor " may include any suitable type of sensing device, such as a light sensor, a pressure sensor, a temperature sensor, a magnetic field sensor, or a humidity sensor, etc. As used throughout the disclosure, the term "actuator " may include any suitable type of actuator, such as an electromechanical actuator, a magnetic actuator, a hydraulic actuator, etc. As used throughout the disclosure, the term "energy source" may refer to any suitable type of energy source, such as a light source (e.g., laser diode or a light-emitting diode, etc.), a heat source (e.g. a heating element), for example.

Figure 2:
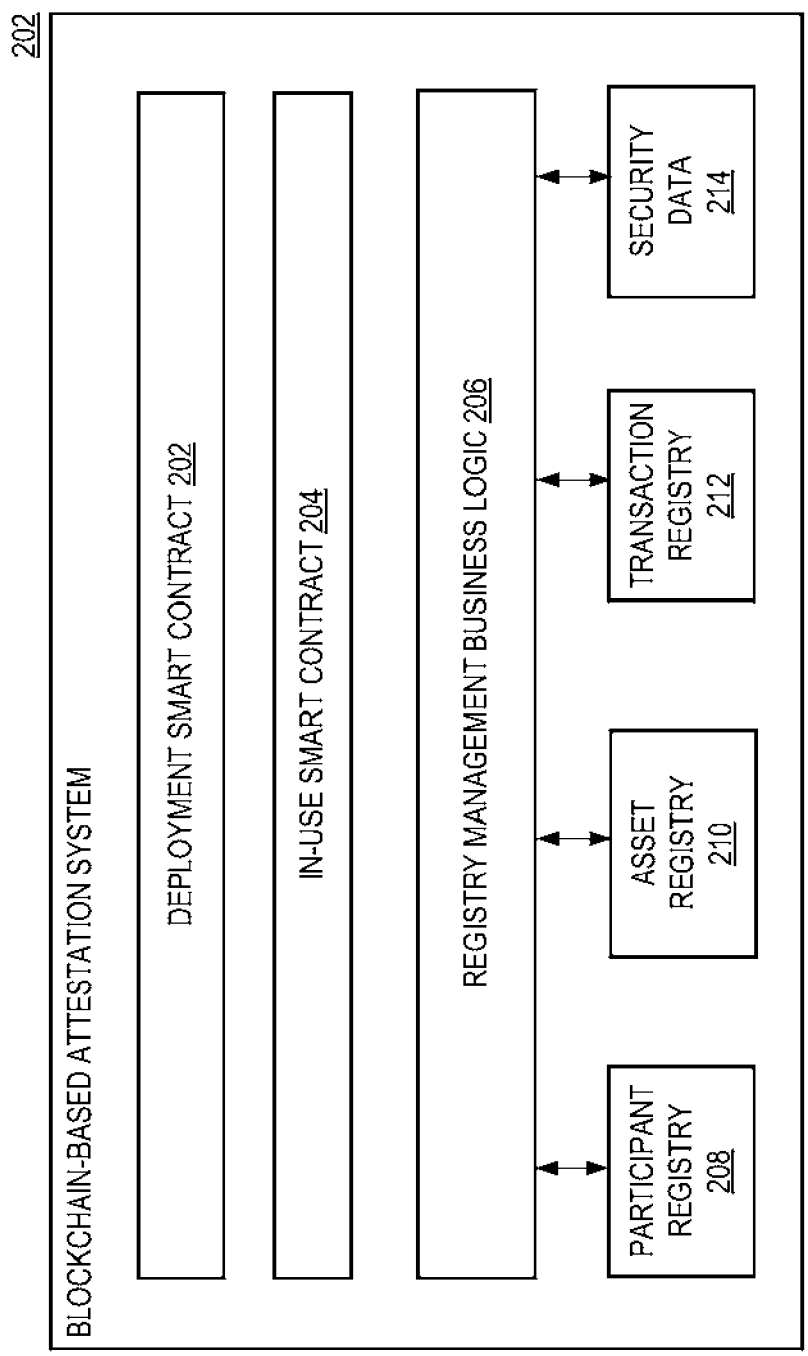
FIG. 2 is a diagram illustrating aspects of the operation of a blockchain-based attestation system, according to aspects of the disclosure.

FIG. 2 is a diagram illustrating aspects of the operation of the blockchain-based attestation system 130, according to aspects of the disclosure. As illustrated the blockchain-based attestation system 130 may include a deployment smart contract 202, an in-use smart contract 204, a registry management business logic 206, a participant registry 208, an asset registry 210, a transaction registry 212, and the security data 214. The deployment smart contract 202 may include one or more rules for determining whether an IoT device should be permitted to join the IoT device network 102. In some implementations, the deployment smart contract 202 may include one or more rules for generating a trust score for an IoT device, which is subsequently used for determining whether the IoT device should be permitted to join the IoT device network 102. The in-use contract may include one or more rules for determining whether data that is associated with an IoT device 110 is valid. By way of example, the data may include a command for the IoT device 110 or a sensor measurement (or another data item) that is generated by the IoT device 110. The registry management business logic 206 may include business logic for storing and retrieving data from any of the registers 208-212.

The participant registry 208 may include identifiers and other information about one or more human users (e.g., administrators) of the IoT device network. For example, the participant registry may include an identifier, and/or a profile, for each of a plurality of users that are allowed to add IoT devices 110 to the IoT device network 102, control one or more of the IoT devices 110 in the IoT device network 102, and receive data from the one or more IoT devices 110 in the IoT device network 102. The asset registry 210 may store the most recent trust score that is accorded to each of the plurality of the IoT devices 110. In addition, the asset registry 210 may include trust scores that have been assigned to data items that are associated with any of the IoT devices 110. The transaction registry 212 may include a list of transactions that have been executed on the blockchain-based attestation system 130. According to the example of FIG. 2, each of the participant registry 208, the asset registry 210, the transaction registry 212, and the security data 214 is stored in a ledger of the blockchain-based attestation system 130. As noted above, copies of the ledger may be stored at any of the IoT devices 110 that are configured to operate as nodes of the blockchain-based attestation system 130.

Figure 3:
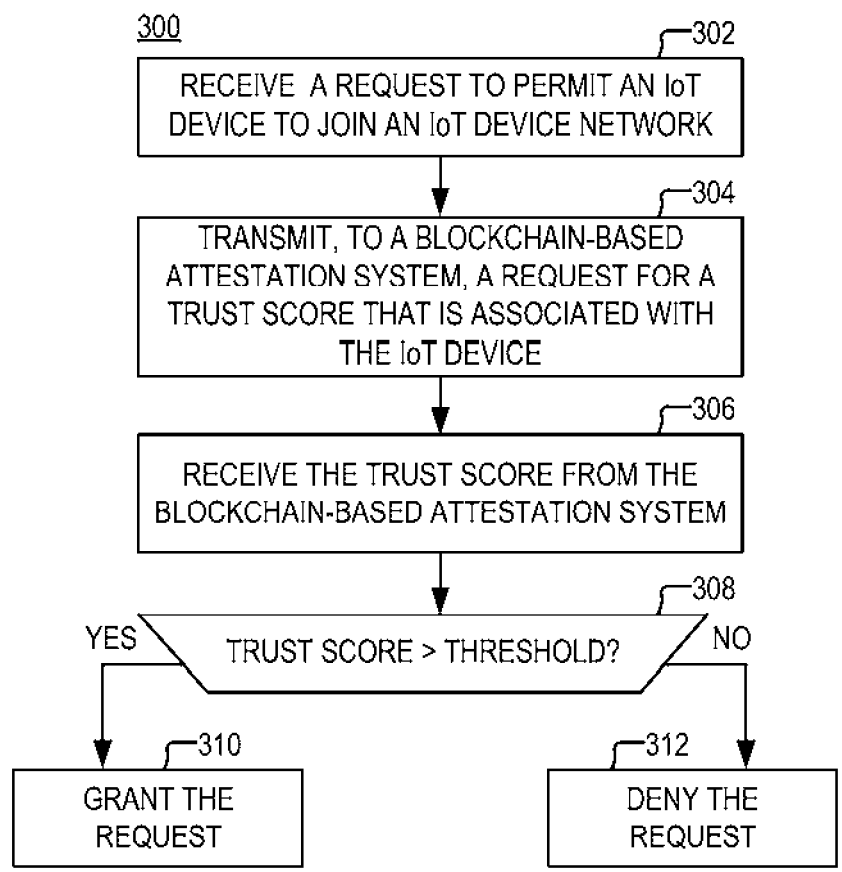
FIG. 3 is a flowchart of an example of a process, according to aspects of the disclosure.

FIG. 3 is a flowchart of an example of a process 300, according to aspects of the disclosure. According to the example of FIG. 3, the process 300 is performed by an access point that is part of the switching fabric 120. However, alternative implementations are possible in which the process 300 is performed by any of the IoT devices 110 or another device that is part of the switching fabric 120. Stated succinctly, the present disclosure is not limited to any specific implementation of the process 300.

A step 302, the access point receives a request to allow a given IoT device 110 to join the IoT device network 102. At step 304, the access point transmits a request to the blockchain-based attestation system 130 for a trust score that is associated with the given IoT device 110. At step 306, the access point receives the trust score from the blockchain-based attestation system 130. At step 308, the access point determines if the trust score is greater than a threshold. If the trust score is greater than the threshold, the process 300 proceeds to step 310. If the trust score is less than the threshold, the process 300 proceeds to step 312. At step 310, the request is granted. At step 312 the request is denied.

The trust score may include any number, string, or alpha-numerical string that indicates the level of trust that is accorded to software that is executing on the given IoT device 110 by the blockchain-based attestation system 130. The software may include one or more of: (i) the firmware of the IoT device and/or (ii) Trusted Platform Module (TPM) software that is executing on the IoT device. The TPM software may implement a virtual (i.e., software-based) cryptoprocessor for encrypting and decrypting data by the given IoT device 110. The TPM software may or may not be compliant with the ISO/IEC 11889 standard. In some respects, the trust score may include an estimate, by the blockchain-based attestation system 130, of how likely it is for the firmware (and/or TPM software) of the given IoT device 110 to be counterfeit and/or infected with malicious code.

The trust score may be a binary variable, which can assume either a first value (e.g., "trusted") and a second value (e.g., "not trusted"). Alternatively, the score may be a non-binary variable that indicates the extent to which the given IoT device 110 is trusted by the blockchain-based attestation system 130. For example, the variable may range from 0 to 10, with 0 indicating that the given IoT device 110 is not trusted at all, with 5 indicating that the given IoT is moderately trusted, and with 10 indicating that a high level of trust is accorded to the given IoT device 110. An example of a process for generating the trust score is discussed further below with respect to FIG. 6. It will be understood that the present disclosure is not limited to any specific format for the trust score.

Granting the request (at step 310) may include any action that causes the given IoT device 110 to join the IoT device network 102. For example, when the process 300 is executed by an access point, granting the request may include allocating an IP number to the given IoT device 110 and/or updating various tables in the switching fabric 120 to indicate that the given IoT device 110 is now part of the IoT device network 102. As another example, when the process 300 is executed by another IoT device, granting the request may include transmitting an instruction to an access point (and/or the switching fabric 120) to add the given IoT device 110 to the IoT device network 102.

The request for the trust score (transmitted at step 304) may include any information that is needed by the blockchain-based attestation system 130 to generate the trust score. In some implementations, the request may include an identifier of the device, an identifier of a firmware version that is running on the given IoT device 110, or an identifier of the TPM software version that is running on the IoT device. Additionally or alternatively, the request may include one or more of a signature of the firmware that is running on the given IoT device 110 or a signature of the TPM software that is running on the given IoT device 110. The term "signature" of software/firmware may refer to a hash, checksum, and/or any other representation of the software.

Figure 4:
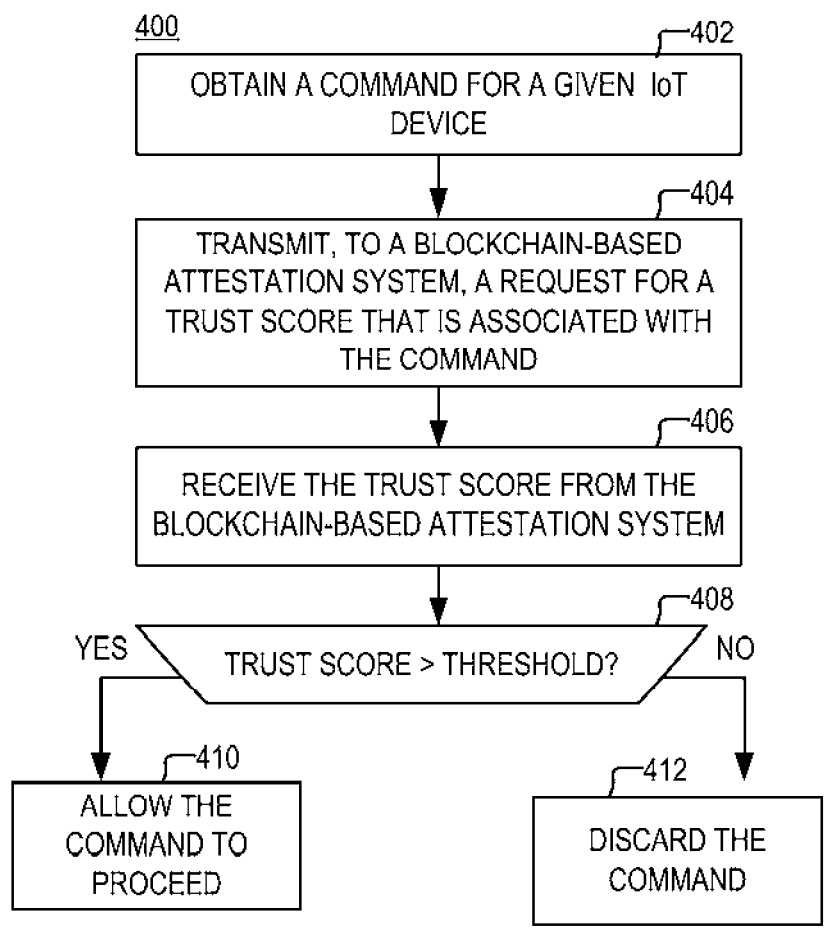
FIG. 4 is a flowchart of an example of a process, according to aspects of the disclosure.

FIG. 4 is a flowchart of an example of a process 400, according to aspects of the disclosure. At step 402, a command is obtained for a given IoT device 110. At step 404, a request is transmitted to the blockchain-based attestation system 130 for a trust score that is associated with the command. At step 406, the trust score associated with the command is received from the blockchain-based attestation system 130. At step 408, a determination is made if the trust score exceeds a threshold. If the trust score exceeds the threshold, the process 400 proceeds to step 410. Otherwise, the process 400 proceeds to step 412. At step 410, the command is allowed to proceed. At step 412, the command is discarded.

The process 400 may be performed by the given IoT device 110, by a switch or another device that is part of the switching fabric 120, or by another IoT device 110. When the process 400 is performed by the given IoT device 110, allowing the command to proceed may include executing the command. When the process 400 is performed by another IoT device 110, allowing the command to proceed may include transmitting the command to the given IoT device 110 or taking any other action that, at least in part, would cause the given IoT device 110 to execute the command. When the process 400 is performed by a switch or another component of the switching fabric 120, allowing the command to proceed may include transmitting the command to the given IoT device 110 or taking any other action that, at least in part, would cause the given IoT device 110 to execute the command.

The command (received at step 402) may include any instruction for the given IoT device 110 to perform an action. For example, if the given IoT device 110 is a light bulb, the command may include an instruction to turn off the light bulb. As another example, if the given IoT device 110 includes an actuator, the command may include an instruction to turn on the actuator or instruction to stop the actuator.

The trust score associated with the command may include an estimate, by the blockchain-based attestation system 130, of how likely the command is to be malicious. A malicious command may include any command that would cause the given IoT device 110 to malfunction, or operate incorrectly. For instance, if the given IoT device 110 is a light bulb, a malicious command may be a command that turns off the light bulb in the middle of the night (e.g., to facilitate a robbery). As another example, if the given IoT device 110 is part of a manufacturing line, a malicious command may be a command that would cause the manufacturing line to stop working or a command that would cause a component of the manufacturing line to fail. For instance, a malicious command may be a command that would cause the given IoT device 110, or another component of the manufacturing line, to operate outside of its normal operating parameters and become damaged as a result.

The trust score may be a binary variable, which can assume either a first value (e.g., "not malicious") and a second value (e.g., "malicious"). Alternatively, the trust score may be a non-binary variable that indicates the extent to which the given IoT device 110 is trusted by the blockchain-based attestation system 130. For example, the variable may range from 0 to 10, where: 0 indicates a low level of confidence that the command is not malicious, 5 indicates a moderate level of confidence that the command is not malicious, and 10 indicates a high level of confidence that the command is not malicious. An example of a process for generating the trust score is discussed further below with respect to FIG. 7. It will be understood that the present disclosure is not limited to any specific format for the trust score.

The request for the trust score (transmitted at step 404) may include any information that is needed by the blockchain-based attestation system 130 to generate the trust score. In some implementations, the request may include the command. Additionally or alternatively, in some implementations, the request may include an identifier of a device from which the command is received. Additionally or alternatively, in some implementations, the request may include an identifier of a user that issued the command. Additionally or alternatively, in some implementations, the request may include an identifier of the given IoT device 110.

Figure 5:
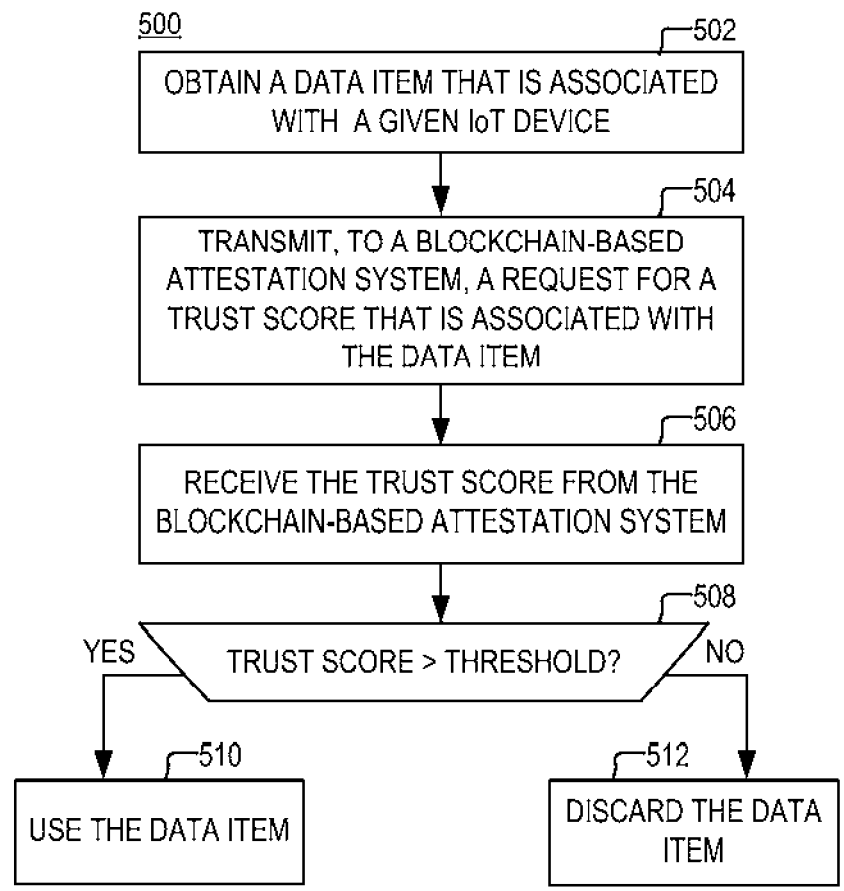
FIG. 5 is a flowchart of an example of a process, according to aspects of the disclosure.

FIG. 5 is a flowchart of an example of a process 500, according to aspects of the disclosure. At step 502, a data item is obtained that is associated with the given IoT device 110. At step 504, a request is transmitted to the blockchain-based attestation system 130 for a trust score that is associated with the data item. At step 506, the trust score associated with the data item is received from the blockchain-based attestation system 130. At step 508, a determination is made if the trust score exceeds a threshold. If the trust score exceeds the threshold, the process 500 proceeds to step 510. Otherwise, the process 500 proceeds to step 512. At step 510, the data item is used. At step 512, the data item is discarded.

The data item (obtained at step 502) may include a sensor measurement that is generated by the given IoT device 110. Additionally or alternatively, the data item may include a status report or an acknowledgment that is generated by the given IoT device 110. Stated succinctly, the present disclosure is not limited to any specific type of data item being obtained at step 502.

The process 500 may be performed by the given IoT device 110, by a switch or another device that is part of the switching fabric 120, by another IoT device 110, or by the management system 106. When the process 500 is performed by the given IoT device 110, using the data item may include transmitting the data item to a destination device (e.g., another IoT device 110 or the management system 106). When the process 500 is performed by a switch or another component of the switching fabric 120, using the data item may include transmitting the data item to a destination device (e.g., another IoT device 110 or the management system 106). When the process 500 is performed by another IoT device 110, using the data item may include transmitting the data item to a destination device (e.g., another IoT device 110 or the management system 106) or storing the data item in a memory of the other IoT device 110. When the process 500 is performed by the management system 106 using the data item may include storing the data item in a memory of the management system 106 or generating a command for another IoT device based on the data item, etc. Stated succinctly, the present disclosure is not limited to any specific use of the data item that is associated with the given IoT device 110

The trust score may include an estimate, by the blockchain-based attestation system 130, of the likelihood that the data item associated with the given IoT device 110 is spoofed. For instance, if the given IoT device 110 is part of an industrial system, and the data item is a sensor measurement, spoofing the data item may trigger a chain of events that would cause the industrial system to fail or operate incorrectly. Accordingly, detecting spoofed data items is advantageous because it may increase the dependability of the given IoT device 110 and/or a larger system, which the given IoT device 110 is part of The trust score may be a binary variable, which can assume either a first value (e.g., "spoofed") and a second value (e.g., "not spoofed"). Alternatively, the trust score may be a non-binary variable that indicates the extent to which the data item that is associated with given IoT device 110 is trusted by the blockchain-based attestation system 130. For example, the variable may range from 0 to 10, where: 0 indicates a low level of confidence that the data item is not spoofed, 5 indicates a moderate level of confidence that the data item is not spoofed, and 10 indicates a high level of confidence that the data item is not spoofed. An example of a process for generating the trust score is discussed further below with respect to FIG. 8. It will be understood that the present disclosure is not limited to any specific format for the trust score.

The request for the trust score (transmitted at step 504) may include any information that is needed by the blockchain-based attestation system 130 to generate the trust score. In some implementations, the request may include the data item. Additionally or alternatively, in some implementations, the request may include an identifier of the given IoT device 110. Additionally or alternatively, in some implementations, the request may include an identifier of a final recipient of the data item (e.g., an identifier of a destination device).

Figure 6:
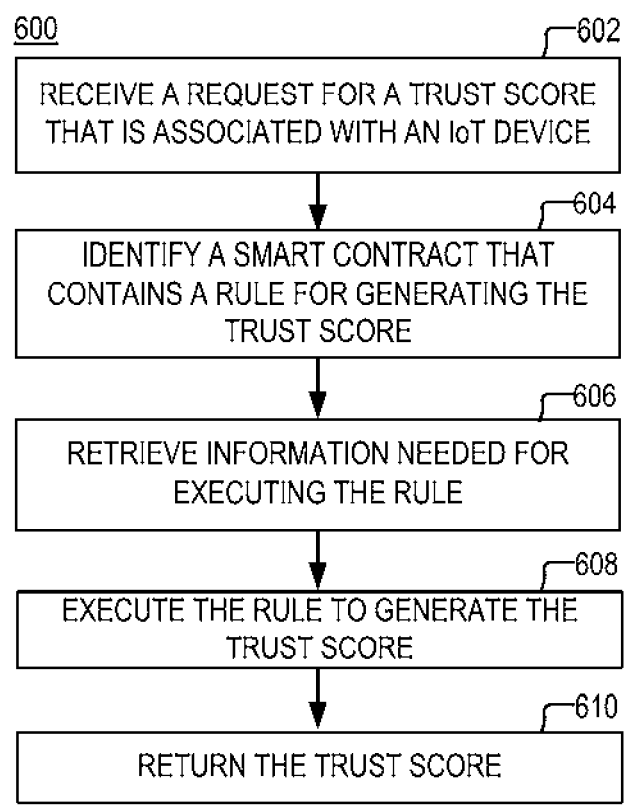
FIG. 6 is a flowchart of an example of a process, according to aspects of the disclosure.

FIG. 6 is a diagram of an example of a process 600, according to aspects of the disclosure. At step 602, the blockchain-based attestation system 130 receives a request to generate a trust score for a given IoT device 110 that is attempting to join the IoT device network 102. At step 604, the blockchain-based attestation system 130 identifies a smart contract that contains a rule for generating the trust score. According to the present example, the blockchain-based attestation system 130 identifies the deployment smart contract 202, which is discussed above with respect to FIG. 2. At step 606, the blockchain-based attestation system 130 retrieves information that is needed for executing the rule. The information may include information identified in the rule and/or smart contract. At step 608, the rule (contained in the smart contract identified at step 604) is executed to generate a trust score for the given IoT device 110. At step 610, the trust score (generated at step 608) is returned to a sender of the request (received at step 602).

The request to generate a trust score, which is received at step 602, may be the same or similar to the request transmitted at step 304 of the process 300 (see FIG. 3). The trust score, as noted above, may indicate the level of trust that is accorded to software that is executing on the given IoT device 110 by the blockchain-based attestation system 130. The software may include the firmware of the given IoT device 110 or Trusted Platform Module (TPM) software. The rule for generating the trust score may include blockchain programming code that specifies one or more steps (and/or operations) for generating the trust score. Executing the rule may include executing the blockchain code. In some implementations, executing the rule may include comparing a signature for the software running on the given IoT device 110 (e.g. firmware and/or TPM software) to a baseline signature for the software. According to the present example, the information for executing the rule (identified at step 606) includes a baseline signature. The baseline signature may include a signature for software that is known to be authentic and not infected with malicious code. Comparing the baseline signature to the signature of the software running on the given IoT device 110 may allow the blockchain-based attestation system 130 to detect whether the software is counterfeit and/or contains malicious code.

In some implementations, the trust score may be generated based, at least in part, on whether the signature of the software running on the given IoT device 110 matches the baseline signature. Additionally or alternatively, in some implementations, the trust score may be generated based, at least in part, on the degree to which the signature of the software matches the baseline signature. Additionally or alternatively, in some implementations, the trust score may be generated based on the security data 214. Additionally or alternatively, in some implementations, the trust score may be generated based on information that is stored in one or more of the participant registry 208, the asset registry 210, and the transaction registry 212. Additionally or alternatively, in some implementations, the trust score associated with the given IoT device 110 may be generated in accordance with the techniques discussed in U.S. Pat. No. 10,057,264, entitled Analytics-Based Internet of Things Security Platform, which is herein incorporated by reference in its entirety. Additionally or alternatively, in some implementations, the trust score associated with the given IoT device 110 may be generated in accordance with the techniques discussed in U.S. Pre-grant Publication 2019/0335333, entitled Security for Network Computing Environment Using Centralized Security System, which is herein incorporated by reference in its entirety. Additionally or alternatively, in some implementations, the trust score may be generated by using any suitable technique for detecting computer viruses and malware.

Figure 7:
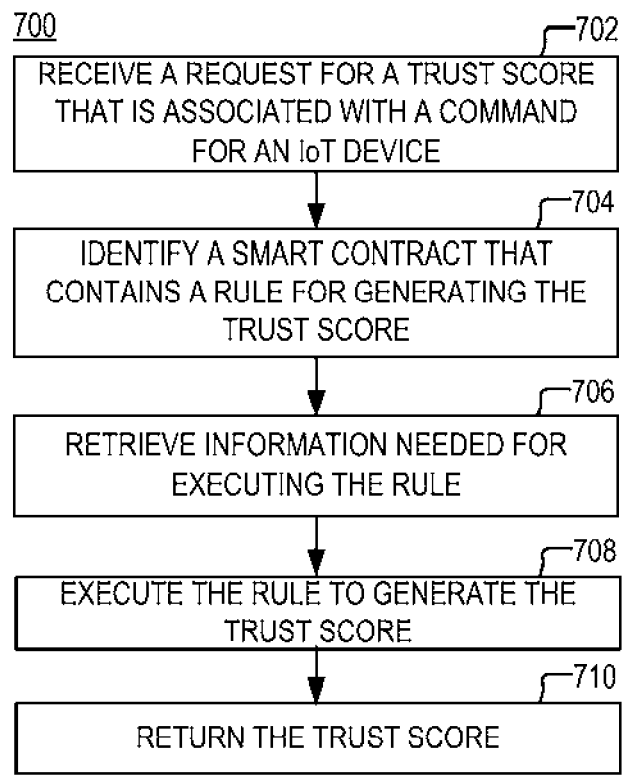
FIG. 7 is a flowchart of an example of a process, according to aspects of the disclosure.

FIG. 7 is a diagram of an example of a process 700, according to aspects of the disclosure. At step 702, the blockchain-based attestation system 130 receives a request to generate a trust score that is associated with a command for a given IoT device 110. At step 704, the blockchain-based attestation system 130 identifies a smart contract that contains a rule for generating the trust score. According to the present example, the blockchain-based attestation system 130 identifies the in-use smart contract 204, which is discussed above with respect to FIG. 2. At step 706, the blockchain-based attestation system 130 retrieves information that is needed for executing the rule. The information may include information identified in the rule and/or smart contract. At step 708, the rule (contained in the smart contract identified at step 704) is executed to generate a trust score that is associated with the command for the given IoT device 110. At step 710, the trust score (generated at step 708) is provided to a sender of the request (received at step 702).

The request to generate a trust score, which is received at step 702, may be the same or similar to the request transmitted at step 404 of the process 400 (see FIG. 4). As noted above, the trust score associated with the command may include an estimate, by the blockchain-based attestation system 130, of how likely the command is to be malicious. The rule for generating the trust score may include blockchain code that specifies one or more steps (and/or operations) for generating the trust score. Executing the rule may include executing the blockchain code.

For example, executing the rule may include detecting whether the command would cause the IoT device, or another component of a system which the IoT device is part of, to deviate from its normal operating parameters. Additionally or alternatively, in some implementations, the trust score may be generated based on the security data 214. Additionally or alternatively, in some implementations, the trust score may be generated based on information that is stored in one or more of the participant registry 208, the asset registry 210, and the transaction registry 212. For example, the trust score associated with the command may be generated at least in part based on a trust score that is assigned to the device that issued the command and/or a credential (or profile) of a user that issued the command. As another example, the trust score associated with the command may be generated at least in part based on whether the transaction registry 212 indicates that the given IoT device 110 has received the same or similar commands in the past. Additionally or alternatively, in some implementations, the trust score associated with the command may be generated in accordance with the techniques discussed in U.S. Pat. No. 10,057,264. Additionally or alternatively, in some implementations, the trust score associated with the command may be generated in accordance with the techniques discussed in U.S. Pre-grant Publication 2019/0335333. Additionally or alternatively, the trust score may be generated in accordance with standard intrusion detection techniques. Stated succinctly, the present disclosure is not limited to any specific method for generating the trust score.

Figure 8:
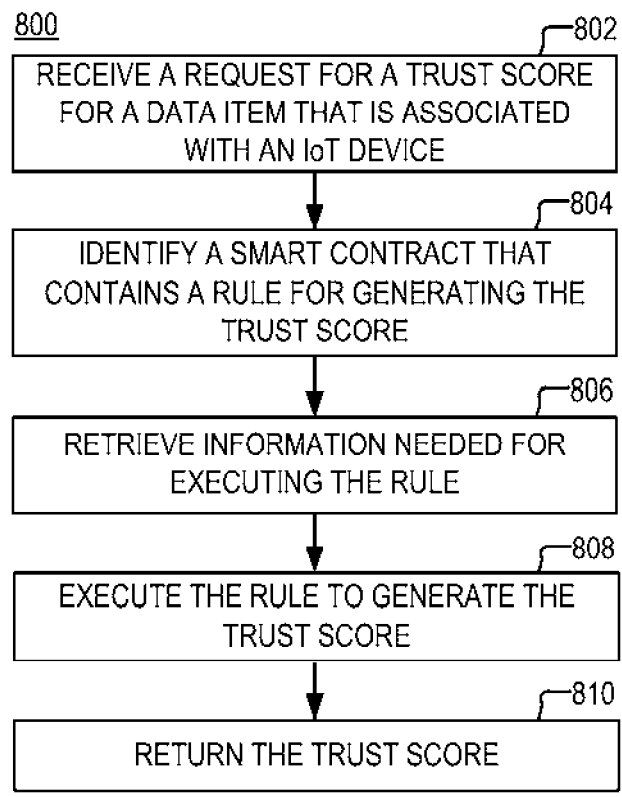
FIG. 8 is a flowchart of an example of a process, according to aspects of the disclosure.

FIG. 8 is a diagram of an example of a process 800, according to aspects of the disclosure. At step 802, the blockchain-based attestation system 130 receives a request to generate a trust score for a data item that is associated with a given IoT device 110. At step 804, the blockchain-based attestation system 130 identifies a smart contract that contains a rule for generating the trust score. According to the present example, the blockchain-based attestation system 130 identifies the in-use smart contract 204, which is discussed above with respect to FIG. 2. At step 806, the blockchain-based attestation system 130 retrieves information that is needed for executing the rule. The information may include information identified in the rule and/or smart contract. At step 808, the rule (contained in the smart contract identified at step 804) is executed to generate a trust score for the data item associated with the given IoT device 110. At step 810, the trust score (generated at step 808) is provided to a sender of the request (received at step 802).

The request to generate a trust score, which is received at step 802, may be the same or similar to the request transmitted at step 504 of the process 500 (see FIG. 5). The data item may include a sensor measurement that is generated by the given IoT device 110, a status report or an acknowledgment that is generated by the given IoT device 110, and/or any other suitable type of data item. As noted above, the trust score may include an estimate, by the blockchain-based attestation system 130, of the likelihood that the data item associated with the given IoT device 110 is spoofed. The rule for generating the trust score may include blockchain code that specifies one or more steps (and/or operations) for generating the trust score. Executing the rule may include executing the blockchain code.

In some implementations, the trust score may be generated based on information that is stored in one or more of the participant registry 208, the asset registry 210, and the transaction registry 212. For example, if the data item is a sensor measurement, the trust score may be generated based on previous sensor measurements that generated by the given IoT device 110, that are recorded in the transaction registry 212. If the previous sensor measurements are the same or similar (e.g., if the sensor measurements are within a predetermined distance from the trust score), the trust score may indicate that the data item is unlikely to be spoofed. Additionally or alternatively, in some implementations, the trust score for the data item may be generated, at least in part, based on a trust score that is assigned to the given IoT device 110 when the given IoT device 110 joins the IoT device network 102. It will be recalled that the trust score for the given IoT device may be recorded in the asset registry 210. Additionally or alternatively, in some implementations, the trust score may be generated on the security data 214.

Additionally or alternatively, in some implementations, the trust score for the data item may be generated in accordance with the techniques discussed in U.S. Pat. No. 10,057,264, entitled Analytics-Based Internet of Things Security Platform. Additionally or alternatively, in some implementations, the trust score for the data item may be generated in accordance with the techniques discussed in U.S. Pre-grant Publication 2019/0335333. Additionally or alternatively, the trust score may be generated in accordance with standard intrusion detection techniques. Stated succinctly, the present disclosure is not limited to any specific method for generating the trust score.

FIGS. 6-8 provide examples of processes for generating different types of trust scores. The processes are described as being executed by the blockchain-based attestation system 130. Each of the processes discussed with respect to FIGS. 6-8 may be executed by using a consensus-building mechanism that is provided by the blockchain-based attestation system 130. The consensus-building mechanism may include a mechanism for group decision making and/or a proof of work mechanism, in which a plurality of nodes of the blockchain-based attestation system 130 participate. In one example, the consensus-building mechanism may include the practical Byzantine Fault Tolerance (pBFT) algorithm. According to the mechanism, a leader node of the blockchain-based attestation system 130 may receive a request for a trust score. The request may be the same as any one of the requests received at steps 602, 702, and 802. Next, the leader node may broadcast the request to a plurality of secondary nodes. As noted above, at least some the secondary nodes may be different IoT devices in the IoT device network 102. Each of the secondary nodes may calculate the trust score independently of the rest (e.g., by using a copy of the ledger of the blockchain-based attestation system 130 that is stored at the secondary node). Each of the secondary nodes may transmit the calculated trust score back to the leader node. If the leader node receives the same score from a predetermined number of secondary nodes, the leader node may determine that the request is valid and return the trust score back to the sender of the request. Those of ordinary skill in the art will readily recognize that blockchain networks by definition provide consensus-building mechanisms. In this regard, it will be understood that the present disclosure is not limited to any specific consensus-building mechanism being provided by the blockchain-based attestation system 130.

Referring to FIG. 9, computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9, are provided as an example only. At least some of the steps discussed with respect to FIGS. 1-9 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Although the examples above discuss numerical representations of trust scores, it will be understood that non-numerical representations are also possible. In this regard, it will be understood that the present disclosure is not limited to any specific method for representing the trust scores. By way of example, and without limitation, the phrase "discarding a data item or command" may refer to one or more of: deleting the data item or command, marking the data item or command as unusable, leaving the data item and/or command in memory for it to be overwritten at a later time, or refusing to further process/use/execute the data item or command.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
 obtaining a data item that is associated with an IoT device, the IoT device including one or more of a sensor, an actuator, or an energy source;
 obtaining, from a blockchain-based attestation system, a trust score that is associated with the data item, the trust score being generated by using a consensus-building mechanism for authenticating the data item that is provided by the blockchain-based attestation system;

when the trust score satisfies a predetermined condition, using the data item; and when the trust score fails to satisfy the predetermined condition, discarding the data item, wherein the IoT device is configured to operate as a node in the blockchain-based attestation system, and the blockchain-based attestation system includes one or more other IoT devices that are part of a same IoT device network as the IoT device, wherein the trust score is generated based on security data that is stored in a ledger of the blockchain-based attestation system, the security data indicating a likelihood of intrusion into the IoT device network, the security data being is generated by security software that is executed on an external computing device.

2. The method of claim 1, wherein:
the data item includes a command for the IoT device to perform an action, and
using the command includes transmitting the command to the IoT device.

3. The method of claim 1, wherein:
the data item includes a command for the IoT device to perform an action, and
using the command includes executing the command by the IoT device.

4. The method of claim 1, wherein:
the data item includes a sensor measurement that is associated with the IoT device, and
using the data item includes forwarding the data item to a recipient.

5. The method of claim 1, wherein:
the data item includes a sensor measurement that is associated with the IoT device, and
using the data item includes at least one of storing the data item in a memory and performing an action based on the data item.

6. The method of claim 1, wherein trust score is generated by executing a rule that is stored in a ledger of the blockchain-based attestation system, the rule being executed by a plurality of nodes of the blockchain-based attestation system.

7. The method of claim 1, wherein the trust score indicates a level of trust accorded to the data item by the blockchain-based attestation system.

8. The method of claim 1, wherein the IoT device is configured to store a copy of at least a portion of a ledger of the blockchain-based attestation system.

9. The method of claim 1, wherein the trust score associated with the data item is generated based on a trust score associated with the IoT device that is stored in a ledger of the blockchain-based attestation system, the trust score associated with the IoT device being generated by the blockchain-based attestation system, the trust score associated with the IoT device indicating a level of trust accorded by the blockchain-based attestation system to software that is executing on the IoT device.

10. A computing device, comprising:
a memory; and
at least one processor that is operatively coupled to the memory, the at least one processor being configured to perform the operations of:
obtaining a data item;
obtaining, from a blockchain-based attestation system, a trust score that is associated with the data item, the trust score being generated by using a consensus-building mechanism for authenticating the data item that is provided by the blockchain-based attestation system, the trust score being generated based on security data that is stored in a ledger of the blockchain-based attestation system, the security data indicating a likelihood of intrusion into the IoT device network, the security data being is generated by security software that is executed on an external computing device;

when the trust score satisfies a predetermined condition, using the data item; and when the trust score fails to satisfy the predetermined condition, discarding the data item, wherein the computing device is configured to operate as a node in the blockchain-based attestation system, and the blockchain-based attestation system includes one or more other computing devices.

11. The computing device of claim 10, wherein:
the data item includes a command for an IoT device to perform an action, and
using the command includes transmitting the command to the IoT device.

12. The computing device of claim 10, wherein:
the data item includes a command to perform an action, and
using the command includes executing the command.

13. The computing device of claim 10, wherein:
the data item includes a sensor measurement, and
using the data item includes forwarding the data item to a recipient.

14. The computing device of claim 10, wherein:
the data item includes a sensor measurement, and
using the data item includes storing the data item in the memory or performing an action based on the data item.

15. A non-transitory computer-readable medium storing one or more processor-executable instructions, which when executed by at least one processor, cause the at least one processor to perform the operations of:
obtaining a data item that is associated with an IoT device, the IoT device including one or more of a sensor, an actuator, or an energy source;
obtaining, from a blockchain-based attestation system, a trust score that is associated with the data item, the trust score being generated by using a consensus-building mechanism for authenticating the data item that is provided by the blockchain-based attestation system, the trust score is generated based on security data that is stored in a ledger of the blockchain-based attestation system, the security data indicating a likelihood of intrusion into the IoT device network, the security data being is generated by security software that is executed on an external computing device;

when the trust score satisfies a predetermined condition, using the data item; and when the trust score fails to satisfy the predetermined condition, discarding the data item, wherein the IoT device is configured to operate as a node in the blockchain-based attestation system, and the blockchain-based attestation system includes one or more other IoT devices that are part of a same IoT device network as the IoT device.

16. The non-transitory computer-readable medium of claim 15, wherein:
the data item includes a command for the IoT device to perform an action, and using the command includes transmitting the command to the IoT device.

17. The non-transitory computer-readable medium of claim 15, wherein:
   the at least one processor is part of the IoT device;
   the data item includes a command for the IoT device to perform an action,
   using the command includes executing the command.

18. The non-transitory computer-readable medium of claim 15, wherein:
   the data item includes a sensor measurement that is associated wtih the IoT device, and
   using the data item includes forwarding the data item to a recipient.

19. The non-transitory computer-readable medium of claim 15, wherein:
   the data item includes a sensor measurement that is generated by the IoT device, and
   using the data item includes at least one of storing the data item in a memory and performing an action based on the data item.

* * * * *